(12) United States Patent
Benco et al.

(10) Patent No.: US 8,055,704 B2
(45) Date of Patent: Nov. 8, 2011

(54) INTERNET SERVICE FOR PASSENGERS ON IN-FLIGHT AIRPLANES

(75) Inventors: David S. Benco, Winfield, IL (US); Michael J. Hawley, Naperville, IL (US)

(73) Assignee: Alcatel Lucent, Paris (FR)

( * ) Notice: Subject to any disclaimer, the term of this patent is extended or adjusted under 35 U.S.C. 154(b) by 153 days.

(21) Appl. No.: 12/387,297

(22) Filed: Apr. 30, 2009

(65) Prior Publication Data

US 2010/0281100 A1 Nov. 4, 2010

(51) Int. Cl.
*G06F 15/16* (2006.01)
(52) U.S. Cl. ...................................................... 709/203
(58) Field of Classification Search .................... 709/203
See application file for complete search history.

(56) References Cited

U.S. PATENT DOCUMENTS

2004/0141170 A1* 7/2004 Jamieson et al. ............ 356/5.01
2010/0087190 A1* 4/2010 Pandit et al. .................. 455/431
* cited by examiner

*Primary Examiner* — Kevin Bates
*Assistant Examiner* — Angela Nguyen
(74) *Attorney, Agent, or Firm* — Carmen Patti Law Group, LLC

(57) ABSTRACT

An exemplary method provides Internet Protocol (IP) devices of passengers of an in-flight airplane with terrestrial Internet IP communications. One airplane in a group of in-flight airplanes functions as a ground link airplane with a direct communication link to a ground station. Each airplane in the group travels in a substantially linear direction. A daisy chain of communications between adjacent airplanes in the group supports inter-airplane IP communications for carrying IP information of the IP devices of the passengers. The ground link airplane collects the IP-based information of the IP devices of the passengers and relays this information to the ground station that is connected to the terrestrial Internet. A communication satellite is not utilized to support any of these communications.

11 Claims, 3 Drawing Sheets

INTERNET SERVICE FOR PASSENGERS ON IN-FLIGHT AIRPLANES

BACKGROUND

This invention relates to providing Internet services for airplane passengers during a commercial flight.

Many people rely on mobile communications to stay connected throughout the day. Some airlines provide Internet access for passengers during flight by using a satellite-based system in which the communication path between the airplane passenger and an earth-based Internet access point traverses a geostationary satellite. Although this provides a workable architecture, time delays of approximately 0.25 seconds are encountered for signals traversing this satellite-based communication path of approximately 44,000 miles. This represents a significantly longer time delay than the few millisecond delays typically observed by Internet users connected by a wire or optical link to a terrestrial Internet access point. Hence users of such an airplane internet service experience unwelcome delays.

SUMMARY

It is an object of the present invention to minimize transit time delays associated with Internet services for airplane passengers during flight by not utilizing a geostationary satellite as part of the communication path.

An exemplary method provides Internet Protocol (IP) devices of passengers of an in-flight airplane with terrestrial Internet IP communications. One airplane in a group of in-flight airplanes functions as a ground link airplane with a direct communication link to a ground station, i.e. the communication path does not traverse a communication satellite. Each airplane in the group travels in a substantially linear direction. A daisy chain of communications between adjacent airplanes in the group supports inter-airplane IP communications for carrying IP information of the IP devices of the passengers to the ground link airplane. The ground link airplane collects the IP-based information of the IP devices of the passengers and relays this information to the ground station that is connected to the terrestrial Internet. A communication satellite is not utilized to support any of these communications.

Another embodiment of the present invention includes exemplary equipment located on the airplanes in a group of airplanes in substantially linear direction for supporting IP communications between passenger devices and the terrestrial internet.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition of a solution by which the previously required satellite link used to provide Internet services for in-flight airplane passengers can be eliminated, thereby limiting the substantial transit time delays associated with satellite-based communications.

Figure 1:
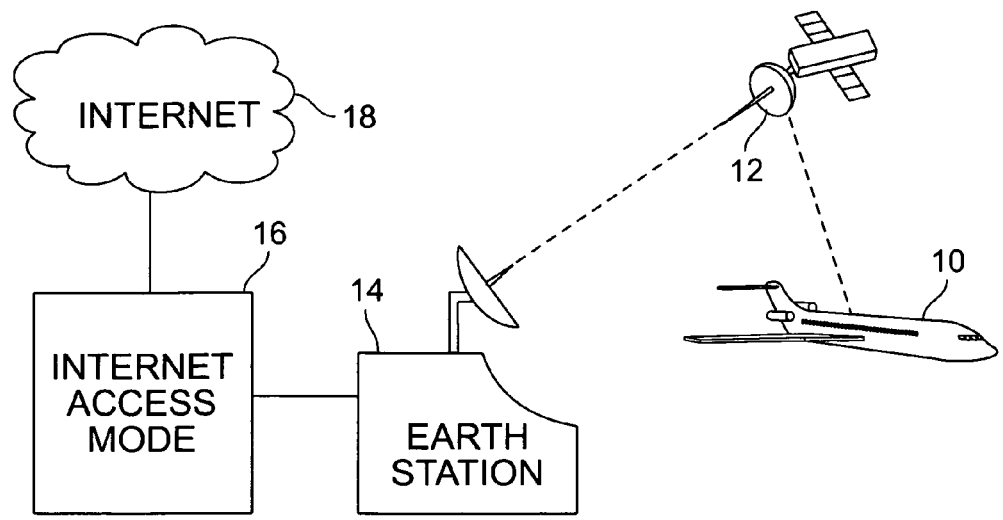
FIG. 1 is a block diagram showing airline internet services utilizing a satellite link per the prior art.

FIG. 1 illustrates the currently used system for providing Internet services to in-flight airplane passengers. An airplane 10 represents a commercial flight by an airline in which passengers are provided with in-flight Internet services. For example, a personal computer of a passenger aboard airplane 10 may be coupled to an on-board Internet link such as by an ethernet cable or by wireless communications within the aircraft, e.g. Wi-Fi. The airplane 10 contains a radio frequency transceiver capable of two-way communications with satellite 12. The local on-board Internet communications are relayed by the airplane's transceiver through the geostationary satellite 12 to an earth station 14 which recovers the carried Internet communications and couples the latter to the Internet access node 16 which is connected to earth based Internet 18. Because the geostationary satellite 12 is located approximately 22,000 miles above the Earth's surface, a total one-way packet path of 44,000 miles results in a transit time of just under 0.25 seconds. Depending on the type of information being transmitted over such an Internet link, such delays can be bothersome to the airplane passenger.

Figure 2:
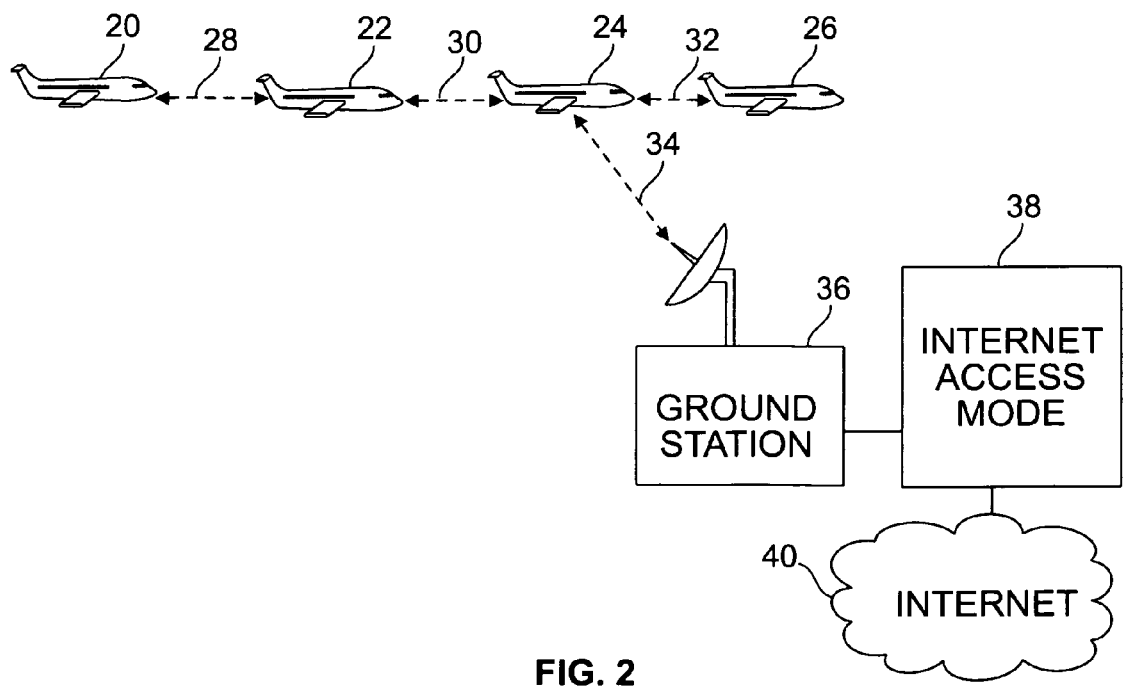
FIG. 2 is a block diagram showing exemplary communication paths for internet service for airline passengers in accordance with the present invention.

FIG. 2 illustrates an exemplary communication technique in accordance with the present invention for providing in-flight Internet services to airplane passengers which does not use a communication satellite as part of the communication link with the terrestrial internet. In this example, airplanes 20, 22, 24 and 26 are all in-flight on route to a destination and all are traveling in the same substantially linear direction, at least on the portion of the journey as illustrated in FIG. 2. With regard to providing passenger Internet communications, each of these airplanes are in communication with each other in a daisy chain pattern in which airplane 20 is in communication with airplane 22 by wireless communication link 28, airplane 22 in communication with airplane 24 by wireless communication link 30, and airplane 24 is in communication with airplane 26 by wireless communication link 32. These communication links are separate from the normal pilot radio communications and navigational communications employed by commercial aircraft. Preferably each of these airplanes is provided with fore and aft unidirectional antennas that support the wireless communication links with adjacent airplanes. As used herein, "substantially linear direction" means that each of the airplanes in the daisy chain are traveling in the same direction and are close enough to being in a straight line so that the transmission and reception of fore and aft signals with the respective adjacent airplanes utilizing fore and aft facing unidirectional antennas is supported. In one example, the unidirectional antennas have a beam width of less than 10 degrees, and in a preferred embodiment, the unidirectional antennas have a beam width of less than 5 degrees. The beam widths are sufficient to accommodate altitude and directional variations of a few thousand feet due to turbulent atmospheric conditions, for example, while maintaining sufficient signal strength so as not to interrupt communications. Because the actual path taken by a commercial aircraft from its point of origination to its destination is determined by air traffic controllers, it is common for airplanes traveling in the same general direction for a least a portion of their journey to be assigned routes and altitudes that place the airplanes in a daisy chain configuration in a substantially linear direction, e.g. routes from major cities on east coast of the United States bound for destinations in western Europe, and routes from the northeast coast of the United States to California destinations, etc. Thus, it is common for groups of airplanes to be in a daisy chain in substantially linear direction. The number of airplanes in one daisy chain is not limited with the requirement only being their ability to communication with the adjacent airplanes. Hence, the linear distance covered by one daisy chain group could extend to cover entire oceans or large land areas.

In the illustrative example, airplane 24 is nearest the ground station 36 and is supported by a communication link 34 suited for carrying passenger Internet communications between the aircraft 24 and ground station 36. In this example, airplane 24 serves as a common communication node by which all Internet communications for passengers aboard airplanes 20, 22, 24 and 26 are collected and relayed to and from the ground station 36 that transfers the Internet communications by Internet access node 38 to the terrestrial Internet 40, where "terrestrial Internet" means the internet as supported by earth mounted equipment. The communication link 34 may be separate from the communication links 28, 30 and 32 that provide inter-aircraft communications that support passenger Internet services.

Figure 3:
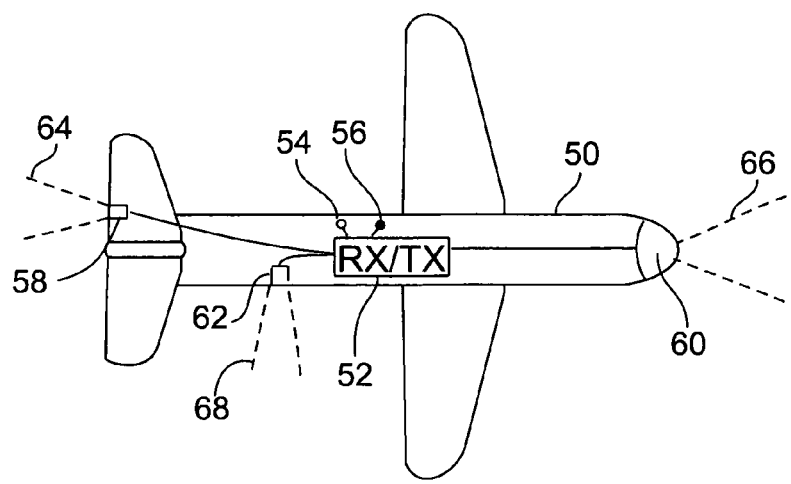
FIG. 3 is a diagram of an exemplary airplane suited for use in providing internet communications in accordance with the present invention.

FIG. 3 illustrates an exemplary airplane 50 suited for supporting the in-flight Internet communications in accordance with an illustrative method of the present invention. A receiver/transmitter (RX/TX) system 52 includes an intra-plane Internet Protocol communication network that supports at least one of wired ethernet communications by ethernet jacks 54 and wireless Wi-Fi type communications by an access point 56. An aft facing unidirectional antenna 58 supports radio frequency communications with an adjacent airplane rearward of airplane 50 in a substantially linear direction, if such an airplane exists. A fore facing unidirectional antenna 60 supports radio frequency communications with an adjacent airplane for of airplane 50 in a substantially linear direction, if such an airplane exists. An antenna 62 is utilized to transmit and receive RF communications by the communication link 34 with the ground station 36. Antenna 62 may be a unidirectional antenna that is periodically adjusted during flight to keep the focus of its primary beam aimed at the stationary ground station 36. Alternatively, antenna 62 may be an antenna with a downward projecting generally 180 degree pattern. The system 52 includes a radio frequency receiver and transmitter coupled to antennas 58 and 60, and suited for supporting RF communications by these antennas with other adjacent in-flight aircraft. The system 52 also includes a radio frequency receiver and transmitter coupled to antenna 62 suited for supporting RF communications by this antenna with the ground station 36. Unidirectional beam patterns 64 and 66 are generated respectively by antennas 58 and 60, and in this example unidirectional beam pattern 68 is generated by antenna 62. The system 52 supports the reception and transmission of associated Internet-based communications with other adjacent airplanes in the chain and with the ground station, if the airplane is designated the ground link airplane.

As an example, assume that Tom is a passenger aboard airplane 20 and has his personal laptop computer plugged into a provided ethernet jack located near his passenger seat for Internet communications. Further assume that Tom has made a request to access an Internet website. This request is received by the Internet communication network aboard airplane 20. In this example, airplane 20 is the rear most of the substantially linear direction daisy chain of airplanes as shown in FIG. 2. Tom's Internet website request is transmitted by communication link 28 to airplane 22, which in turn retransmits (relays) this request by communication link 30 to airplane 24. Because airplane 24 serves as the common communication node for communications with ground station 36 in this example, Tom's Internet website request is transmitted from airplane 24 by communication link 34 to the ground station 36 which forwards the request by Internet access node 38 to the terrestrial Internet 40. A reply from the website receiving the request is routed through Internet access node 38 to ground station 36 and over the communication link 34 to airplane 24. This reply is retransmitted by airplane 24 by communication link 30 to airplane 22 which retransmits the reply over communication link 28 to airplane 20 which couples the reply to its intra-plane Internet network to reach Tom's laptop computer.

Figure 4:
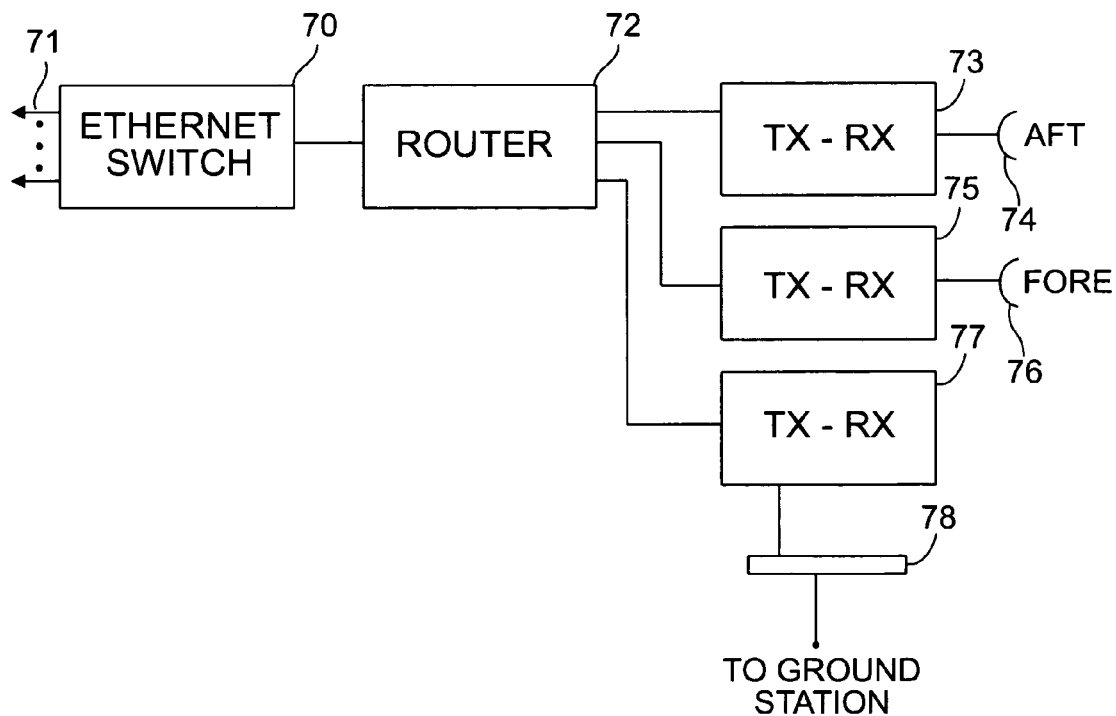
FIG. 4 is a block diagram showing exemplary communication equipment for providing internet service in airline in accordance with the present invention.

FIG. 4 shows exemplary equipment located on each aircraft in accordance with an embodiment of the present invention. An ethernet switch 70 includes a plurality of ethernet inputs 71 disposed throughout the passenger cabin of the aircraft to facilitate connection with ethernet capable computing devices of passengers, e.g. laptop computers, etc. Although wire line ethernet communications are described in this example, it will be apparent that other types of communications could be utilized, e.g. wireless access points, Bluetooth, etc. The ethernet switch 70 is connected to a router 72 that serves its normal purpose as a packet distributor. A transceiver 73 is coupled to an aft antenna 74; transceiver 75 is coupled to a fore antenna 76; and transceiver 77 is coupled to a ground station antenna 78. Each of the transceivers is capable of transmitting and receiving radio frequency signals that can be encoded to carry information contained in IP packets. Each of the transceivers is connected respectively to the router 72.

Assume that IP information received on communication link 28 by transceiver 73 of airplane 22 is decoded into corresponding IP packets sent to router 72. Because these packets are destined for the terrestrial Internet and router 72 stores a routing table indicating how to forward IP packets, router 72 transmits these packets to transceiver 75 which transmits these over communication link 30 to airplane 24 which serves as the ground link airplane. In this example, transceiver 77 on airplane 22 is not currently utilized since this airplane is not designated as the ground link airplane. On airplane 24, these packets are received by its transceiver 73 which sends the decoded packets to its router 72. Since airplane 24 is currently designated as the ground link airplane and since its router 72 will include a routing table identifying transceiver 77 as the appropriate destination to receive packets having a terrestrial Internet destination, router 72 on airplane 24 will route all received IP packets originating from other airplanes in the chain to transceiver 77 which in turn transmits radio frequency signals carrying these packets to the ground station 36.

Assume that IP information is received on communication link 34 from the ground station 36 by transceiver 77 on airplane 24. The decoded IP packets are transmitted from the transceiver 77 to the router 72 on airplane 24. The router 72 will consult its routing table to identify where the received IP packets are to be forwarded based on IP addressing. If the received IP packets have an IP address associated with an airplane aft of airplane 24, the packets will be routed to transceiver 73. If the received IP packets have an IP address associated with an airplane fore of airplane 24, the packets will be routed to transceiver 75. If the received IP packets have an IP address associated with airplane 24 itself, i.e. the device of a passenger aboard airplane 24, the packets will be routed to ethernet switch 74 distribution to the associated device. The router builds, stores and updates its routing table in a normal manner based on the origination and destination addresses of IP packets.

Figure 5:
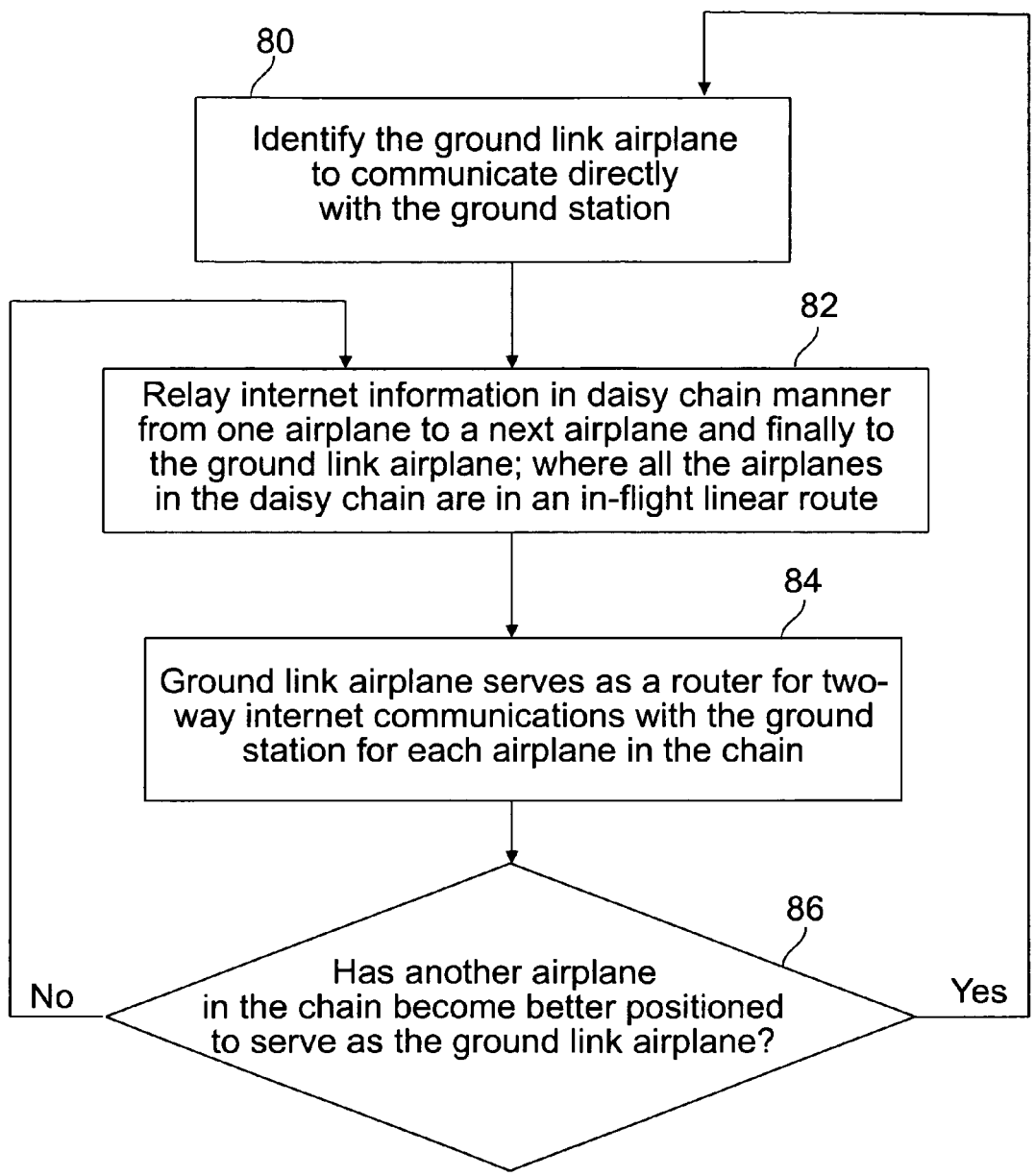
FIG. 5 is a flow diagram of steps of an exemplary method in accordance with the present invention.

FIG. 5 is a flow diagram of steps in accordance with an exemplary embodiment of a method of the present invention. In step 80 a ground link airplane is identified to communicate directly with the ground station. In the illustrative example of FIG. 2, airplane 24 serves as the ground link airplane. The ground link airplane may be identified as the airplane in a daisy chain of airplanes having the strongest signal strength as received by ground station 36. Alternatively, location coordinates of each of the airplanes in the daisy chain can be collected by the ground station and compared to the location coordinates on the ground station, with the airplane having the closest location to the ground station being selected to be the ground link airplane. As the airplanes progress it will be apparent that different planes will be assigned to be the ground link airplane based on a selected technique that seeks to ensure adequate communications between the selected airplane and the ground station 36.

In step 82, passenger originated Internet information (requests) are relayed in a daisy chain manner from an originating airplane a next airplane closer to the ground link airplane and finally to the ground link airplane. All of the airplanes in the daisy chain are in a substantially linear direction. In step 84 the ground link airplane serves as a router for two-way Internet communications between the ground station and each of the airplanes in the daisy chain.

In step 86 a determination is made of whether another airplane in the daisy chain has become better positioned, e.g. stronger signal strength, etc., to serve as the ground link airplane. A YES determination by step 86 results in step 80 again identifying the appropriate ground link airplane to be utilized. A NO determination by step 86 results in a return to step 82 in which Internet communication services is continued.

Step 82 may further include a determination of where each airplane is located in the daisy chain relative to the ground link airplane. That is, a determination can be made of whether each airplane in the daisy chain is fore or aft of the ground link airplane relative to the direction of travel (or is itself the ground like airplane). With this determination each airplane can determine whether to transmit an Internet request from one of its passengers in only one of the fore or aft directions. Such a determination may be made and communicated to the other airplanes in the chain by having the ground link airplane (or the ground station) generate and send a message that identifies the ground link airplane, e.g. an IP address assigned to the ground link airplane and a predetermined flag signifying it is the ground link airplane. Each airplane can add its IP address to this identification message as it propagates through the chain so that each airplane receiving the message will know which airplane is the ground link airplane as well as each of the airplanes between it and the ground link airplane. Based on whether this message is received on the fore or aft antenna by each airplane, each airplane can hence determine whether Internet communications are to be transmitted in a fore or aft direction.

Alternatively, each airplane in the daisy chain can transmit IP packets originating on that airplane in both the fore and aft directions in order to ensure that the communication will reach the ground link airplane. Of course, Internet communications received from an adjacent airplane in the daisy chain in one of the fore or aft direction will be retransmitted, i.e. relayed, in the same direction of travel to the other of the fore or aft directions so that each of the airplanes serves as a point-to-point relay towards the end airplane in the chain. It will be apparent that the ground link airplane itself need not further relay received Internet communications from other airplanes in the daisy chain since it effectively functions as a router that transmits all air originating traffic towards the ground station and receives and distributes all air destined traffic from the ground station to the other airplanes in the daisy chain.

Although exemplary implementations of the invention have been depicted and described in detail herein, it will be apparent to those skilled in the art that various modifications, additions, substitutions, and the like can be made without departing from the spirit of the invention. For example, the transceivers 73, 75 and 77 may be functionally provided by a single transceiver module. Additionally, the router 72 and the ethernet switch may be implemented in a single module.

The scope of the invention is defined in the following claims.

We claim:

1. A method that provides Internet Protocol (IP) devices of passengers of an in-flight airplane with terrestrial Internet IP communications comprising the steps of:

identifying a first airplane in a group of at least two in-flight airplanes as a ground link airplane, where each airplane in the group is traveling in a substantially linear direction, the ground link airplane having a first two-way radio frequency communication link with a ground station located on the earth;

maintaining for each airplane in the group a second and third two-way radio frequency communication link with an adjacent fore and aft airplane in the group, respectively, if such an adjacent airplane exists, where the second and third two-way radio frequency communication links support inter-airplane IP communications via unidirectional fore and all radio frequency radiation patterns centered about the substantially linear direction;

transferring IP-based information of the IP devices of the passengers on each in-flight airplane in the group using the second and third two-way radio frequency communication links by daisy chain transfer through each adjacent airplane to the ground link airplane;

transferring, by the ground link airplane, the IP-based information of the IP devices of the passengers to the ground station via the first two-way radio frequency communication link, where the ground station is connected to the terrestrial Internet and couples the IP-based information to the terrestrial internet.

2. The method of claim 1 wherein the first two-way radio frequency communication link between the ground link airplane and the ground station does not traverse a communication satellite.

3. The method of claim 1 wherein a communication satellite in not used in the communications among the airplanes in the group or with communications with the ground station.

4. The method of claim 1 further comprising the step of determining whether the first airplane identified as the ground link airplane remains best suited among the airplanes in the group to serve as the ground link airplane, and upon determining that another airplane of the group is best suited to serve as the ground link airplane, identifying the another airplane as the ground link airplane and transmitting a message to the other airplanes in the group that identifies the another airplane as being the ground link airplane.

5. The method of claim 1 further comprising the step of determining whether the ground link airplane is fore or aft of each of the other airplanes in the group, wherein the transferring of the IP-based information of the IP devices of the passengers on each in-flight airplane in the group by daisy chain transfer is through adjacent airplanes in the determined fore or aft direction to the ground link airplane.

6. Apparatus disposed aboard a first airplane for supporting Internet Protocol (IP) communications with devices of passengers while in-flight with terrestrial Internet, the apparatus comprising:
  means for receiving IP packets originated by passenger devices aboard the first airplane and for transmitting IP packets to the passenger devices aboard the first airplane;
  first and second radio frequency transceivers on the first airplane associated with respective aft and fore unidirectional antennae;
  one of the first and second transceivers using the respective aft and fore unidirectional antenna with radio frequency radiation patterns centered about a substantially linear direction to establish an inter-airplane communication link with another in-flight airplane that is respectively aft or fore of the first airplane, where the first airplane and the another airplane define a group of in-flight airplanes where each airplane in the group is traveling in the substantially linear direction;
  a router coupled to the means for receiving and transmitting IP packets, and to the first and second transceivers for distributing IP packets;
  the router sending outbound IP packets having a terrestrial internet address received from the means for receiving IP packets to the one of the first and second transceivers which transmits the outbound IP packets via the inter-airplane communication link to the another airplane to be relayed to by the another airplane to the terrestrial internet;
  the one of the first and second transceivers receiving inbound packets having an IP address of a device of passenger on the first airplane via the inter-airplane communication link from the another airplane where the inbound packets originated from the terrestrial internet;
  the one of the first and second transceivers transmitting the inbound packets to the router which sends the inbound IP packets to the means for transmitting IP packets to the passenger devices for transmission to the passenger device with the IP address of the inbound packets.

7. The apparatus of claim 6 further comprising a third transceiver associated with an earth oriented antenna where the third transceiver is coupled to the router and is in direct communication with a ground station to facilitate IP communications between passenger devices on the first airplane and the terrestrial Internet coupled to the ground station.

8. The apparatus of claim 6 wherein the aft and fore unidirectional antennae have a beam bandwidth of 10 degrees centered about the substantially linear direction.

9. The apparatus of claim 8 wherein the aft and fore unidirectional antennae with the beam bandwidth of 10 degrees centered about the substantially linear direction provides fore and aft communication links that are limited to the another in-flight airplanes in the same substantially linear direction.

10. The method of claim 1 wherein the unidirectional fore and aft radio frequency radiation patterns have a beam bandwidth of 10 degrees centered about the substantially linear direction.

11. The method of claim 10 wherein the unidirectional fore and aft radio frequency radiation patterns with the beam bandwidth of 10 degrees centered about the substantially linear direction provides fore and aft communication links that are limited to airplanes in the group that are traveling in the same substantially linear direction as the first airplane.

* * * * *